United States Patent [19]
Juri et al.

[11] Patent Number: 5,781,690
[45] Date of Patent: Jul. 14, 1998

[54] VIDEO SIGNAL RECORDER HAVING A FRAME CODER

[75] Inventors: Tatsuro Juri, Osaka; Yuji Fujiwara, Nishinomiya; Masakazu Nishino, Kashiwara; Toyohiko Matsuta, Katano; Shigeru Awamoto, Osaka, all of Japan

[73] Assignee: Matsushita Electric Industrial Co., Ltd., Osaka, Japan

[21] Appl. No.: 794,407

[22] Filed: Feb. 3, 1997

Related U.S. Application Data

[63] Continuation of Ser. No. 213,538, Mar. 16, 1994, abandoned.

[30] Foreign Application Priority Data

| Mar. 17, 1993 | [JP] | Japan | 5-056824 |
| Jun. 1, 1993 | [JP] | Japan | 5-130839 |
| Jun. 18, 1993 | [JP] | Japan | 5-147344 |

[51] Int. Cl.⁶ .................................................. H04N 5/76
[52] U.S. Cl. ................................. 386/111; 386/124
[58] Field of Search .................... 386/6–8, 40, 33, 386/68, 81, 109–112, 124; 360/32, 48; H04N 5/76, 5/92, 9/79, 5/78, 5/782, 5/7822, 5/7824, 5/7826, 5/7828

[56] References Cited

U.S. PATENT DOCUMENTS

| 4,969,055 | 11/1990 | Oberjatzas et al. | |
| 5,047,852 | 9/1991 | Hanyu et al. | |
| 5,140,437 | 8/1992 | Yonemitsu et al. | 358/342 |
| 5,465,180 | 11/1995 | Amada et al. | 358/343 |
| 5,473,479 | 12/1995 | Takakura | 360/48 |

FOREIGN PATENT DOCUMENTS

| 0469842 | 2/1992 | European Pat. Off. . | |
| 0492537 | 7/1992 | European Pat. Off. . | |
| 0517141 | 12/1992 | European Pat. Off. . | |
| 0562845 | 9/1993 | European Pat. Off. | H04N 5/92 |
| 60-223275 | 11/1985 | Japan . | |
| 3054983 | 3/1991 | Japan . | |
| 4229382 | 8/1992 | Japan . | |

OTHER PUBLICATIONS

"Adaptive Coding of Monochrome and Color Images," W–H Chen et al., *IEEE Transactions On Communications*, vol. COM–25, No. 11, Nov. 1997.

*Primary Examiner*—Thai Tran
*Attorney, Agent, or Firm*—McDermott, Will & Emery

[57] ABSTRACT

In the video signal recording apparatus of the present invention, when recording video signals of a plurality of frames after highly efficiently coding the same, video signals of the first frame are coded within the frame and divided into compression blocks each of which block is recorded to a corresponding recording block at a fixed position.

2 Claims, 6 Drawing Sheets

VIDEO SIGNAL RECORDER HAVING A FRAME CODER

This is a continuation application of application Ser. No. 08/213,538, Mar. 16, 1994, now abandoned.

BACKGROUND OF THE INVENTION

1. Field of the Invention

The present invention relates to a recording apparatus for use in recording or transmitting video signals after processing the same with high efficiency, that is, processing through the bit rate reduction.

2. Description of the Prior Art

The aforementioned bit rate reduction has been known as one way to reduce the amount of data of video signals. The bit rate reduction eliminates the redundancy of video signals thereby to reduce the amount of data.

In order to execute the bit rate reduction, adjacent pixels are gathered into the configuration of a block and compressed through the orthogonal transformation. The block subjected to the above orthogonal transformation is called as an orthogonal transformation block. After the orthogonal transformation, the data is variable-length coded to improve the compression efficiency before being recorded or transmitted.

Meanwhile, in effecting the bit rate reduction for moving images, it is one practice currently performed to improve the compression rate with using the correlation of frames, i.e., to code only the differential value between the adjacent frames, and a so-called motion compensation is effective to obtain the above differential value. The amount of data of differential signals between the frames is reduced by detecting a motion between the adjacent frames and compensating one of the frames by the motion compensation. Therefore, when moving images are to be coded highly efficiently, the data subsequent to the motion compensation is generally processed through the orthogonal transformation.

Since the above-described arrangement uses variable-length coding, however, it accompanies a disadvantageous problem that the variable-length coded data may not be decoded in case of occurrence of errors at the regenerating time. On the other hand, in a different method, an address data is added and recorded to show for every predetermined period of recording data which of the orthogonal transformation blocks the subject data is related to. Even if the coding synchronization of the variable-length coding is lost due to an error of the transmission line, this method makes it possible to remedy the coding synchronization with the help of additional data such as address data, pointers, etc. having a set number of blocks recorded as one unit. However, the compression efficiency for the bit rate reduction is deteriorated because of the necessity to record the additional data. It is therefore highly required to trim the redundancy of the additional data before recording.

When the data is to be reproduced at high speeds by a VCR or the like, although it is desired that the recording position of each data corresponds correctly to the position of the subject data on the screen, the positional relationship becomes instable as a result of the employment of variable-length coding, and the image quality at the high-speed reproduction time of data is greatly degraded.

Although the data obtained from the data within a frame through the bit rate reduction is needed particularly at the high-speed reproduction time or when the error is to be concealed, the position of the data generated from the data within the frame is instable in the conventional arrangement, and therefore the data is hardly utilized.

SUMMARY OF THE INVENTION

The present invention is devised to solve the above-described disadvantages of the prior art for coding data with high efficiency among a plurality of frames, and has for its object to provide an improved recording apparatus capable of effectively recording data.

An essential object of the present invention is to provide a video signal recording apparatus which uses interframe coding to suppress influences of errors of a VCR at the reproducing time.

A further object of the present invention is to provide a video signal recording apparatus which uses interframe coding allowing a VCR to reproduce data at high speeds.

A still object of the present invention is to provide a video signal recording apparatus which, using coding between two frames, enables edition of data frame by frame.

A still further object of the present invention is to provide a video signal recording apparatus which effectively reduces the amount of additional data for coding between two frames.

A yet further object of the present invention is to provide a video signal recording apparatus which effectively reduces the amount of additional data for coding of multi frames.

According to a first aspect of the present invention, a video signal recording apparatus is provided with a grouping means for grouping input moving video signals every K frames, a high efficiency coding means for highly efficiently coding the first frame in the group with using the data within the frame, and an (i)th frame ($1<i\leq K$) in the group with using the data of the (i)th frame or the difference data between the (i)th frame and the other frame than the (i)th frame, a block forming means for dividing the coded data of the first frame into n compression blocks, a first arranging means for preparing L recording tracks and n recording blocks corresponding to the n compression blocks respectively at a predetermined position in the L recording tracks, thereby arranging the data of the compression blocks of the first frame to the corresponding recording blocks, a second arranging means for arranging the data of the compression blocks of the first frame overflowing from the corresponding recording blocks to vacant recording blocks corresponding to the first frame, a third arranging means for, in the case where the data of the compression blocks of the first frame remains even after all of the recording blocks corresponding to the first frame are fully occupied, recording the remaining data of the compression blocks of the first frame to a section other than the n recording blocks in the L recording tracks, and a fourth arranging means for arranging the highly efficiently coded data of the second frame and thereafter to a section of the L recording tracks left when the remaining data of the compression blocks of the first frame is recorded.

In the above-depicted constitution of the invention, data of n compression blocks highly efficiently coded by the data within a frame in L tracks is recorded to fixed n recording blocks. Therefore, at the high-speed reproduction time, by scanning the n recording blocks sequentially, data composed of only the data within the frame can be sequentially reproduced, whereby the image can be reproduced smoothly. Even if the coding synchronization of the variable-length coding is lost due to an error of the transmission line, the variable-length coding is reset in the above n recording blocks, therefore without being influenced by the error. Accordingly, the invention restricts the influences of the error of the transmission line to the data composed of only the important data within the frame to minimum.

According to a second aspect of the present invention, a recording apparatus is provided with a grouping means for grouping input moving video signals every 2 frames, a high efficiency coding means for highly efficiently coding the first frame in the group with using the data within the first frame, and the second frame with using the data of the second frame or the difference data between the first and second frames, a block forming means for dividing the data of the first frame into m×n compression blocks when the data is to be coded by the high efficiency coding means, a first arranging means for preparing 2n recording tracks and dividing each of n tracks among the 2n recording tracks to m recording blocks, thereby constituting m×n recording blocks in total to correspond to the m×n compression blocks block by block, and arranging the data of the compression blocks of the first frame highly efficiently coded by the coding means to the corresponding recording blocks, a second arranging means for arranging the data of the compression blocks of the first frame which cannot be arranged to the corresponding recording blocks to the other vacant recording blocks allotted for the first frame, a third arranging means for, in the case where the data of the compression blocks of the first frame still remains even after all of the recording blocks allotted for the first frame are fully occupied, arranging the remaining data of the compression blocks of the first frame to the remaining n recording tracks among the 2n recording tracks, and a fourth arranging means for arranging the highly efficiently coded data of the second frame or the difference data between the first and second frames to a section of the remaining n recording tracks left after the remaining data of the compression blocks of the first frame is recorded.

In the recording apparatus constructed as above, data which is highly efficiently coded within a frame is recorded with priority to the first n tracks of 2n tracks allotted to record data of two frames. Therefore, similar to the above first invention, it becomes possible to reproduce data at the high-speed reproduction time and to conceal the data when the transmission error happened. Since most of data of the first frame is reproduced only from the first n tracks, fresh video data can be recorded to the latter n tracks (where part of data of the first frame and data of the second frame are recorded), thus enabling edition of data frame by frame whether the data is compressed by two frames.

According to a third aspect of the present invention, a recording apparatus is provided with a high efficiency coding means for highly efficiently coding, while handling consecutive K frames of input video signals as one unit, the first frame in the K frames with using the data within the first frame and an (i)th frame ($1<i\leq K$) with using the data within the (i)th frame or the differential data between the (i)th frame and the other frame than the (i)th frame, and a recording means for dividing and recording highly efficiently coded data of K frames to L tracks, wherein, when the first frame is to be coded by the high efficiency coding means, the data of the first frame is divided into n coding blocks, and while a coding unit is formed of m blocks which is an integral multiple of j when consecutive j blocks constituting the coding block on the screen are rendered one unit., the data is coded by the coding unit. The recording means of the apparatus is adapted so that in recording the first frame, n recording blocks are allotted respectively at a specific position in the L tracks to correspond to the coding blocks block by block, and the data of the coding blocks of the first frame coded by the high efficiency coding means is recorded sequentially to the corresponding recording blocks to an EOB code word indicating the end of the coded data, and in recording part of the coded data as a recording block high frequency data which cannot be input to the corresponding recording blocks, the recording block high frequency data is recorded to the corresponding recording blocks bit by bit if a vacant space remains in the corresponding recording blocks after the coded data is recorded, and further, in recording part of the recording block high frequency data as a coding unit high frequency data which cannot be input to the corresponding recording blocks and is a collection of the remaining recording block high frequency data by m blocks of the coding unit, while a coding unit recording block is constituted by gathering the corresponding recording blocks by m blocks of the coding unit, the coding unit high frequency data is recorded to the coding unit recording block bit by bit if a vacant space remains in the coding unit recording block after the recording block high frequency data is recorded, still, in recording part of the coding unit high frequency data which cannot be input to the coding unit recording block, the coding unit high frequency data is recorded to a section other than the n recording blocks in the L tracks, and yet, in recording the (i)th frame, the data of the (i)th frame is highly efficiently coded and recorded to a remaining section of the L tracks after the remaining coding unit high frequency data is recorded.

In the above-described arrangement, the recording apparatus of the third invention is capable of effectively handling special reproduction and concealment of data through finer control as well as achieving the same effects as in the first invention.

According to a fourth aspect of the present invention, a recording apparatus is provided with a high efficiency coding means for highly efficiently coding, while handling two consecutive frames of input video signals as one unit, the first frame of the two frames with using the data within the frame and, the second frame with using the data within the second frame or the differential data between the first and second frames, and a recording means for dividing and recording the highly efficiently coded data of two frames to 2n tracks, wherein, when the first frame is to be coded by the high efficiency coding means, the data of the first frame is divided into m×n coding blocks, and while a coding unit is formed of j blocks which is an integral multiple of k when consecutive k blocks constituting the coding block on the screen are rendered one unit, the data of the first frame is coded by the coding unit. The recording means of the apparatus is adapted so that in recording the first frame, each of first n tracks of the 2n tracks is divided into m recording blocks, thereby constituting m×n recording blocks in total to correspond to the m×n coding blocks block by block, and the data of the coding blocks of the first frame coded by the high efficiency coding means is recorded sequentially to the corresponding recording blocks to an EOB code word indicating the end of the coded data, and in recording part of the coded data as a recording block high frequency data which cannot be input to the corresponding recording blocks, the recording block high frequency data is recorded to the corresponding recording blocks bit by bit if a vacant space remains in the corresponding recording blocks after the coded data is recorded, and further in recording part of the recording block high frequency data as a coding unit high frequency data which cannot be input to the corresponding recording blocks and is a collection of the remaining recording block high frequency data by j blocks of the coding unit, while a coding unit recording block is formed by gathering the corresponding recording blocks by j blocks of the coding unit, the coding unit high frequency data is recorded to the coding unit recording block bit by bit if a vacant space remains in the coding unit recording block after the recording block high frequency data is recorded, still in recording part of the coding unit high frequency data which cannot be input to the coding unit recording block, the coding unit high frequency data is recorded to the latter n tracks of the 2n tracks, and yet in recording the second frame, the data of the second frame is highly efficiently coded and recorded to a section of the latter n tracks left after the remaining coding unit high frequency data is recorded.

In the constitution as above, the recording apparatus makes finer control and effectively records the data subjected to special reproduction and concealment, along with the same effects as in the second invention.

According to a fifth aspect of the present invention, a recording apparatus which records input video signals by highly efficiently coding consecutive N frames of the signals as one unit, including a coding unit forming means for forming coding units with the use of each frame in the N frames, a high efficiency coding means for coding the coding units highly efficiently, and a recording means for dividing and recording the highly efficiently coded data of N frames to L tracks which is at least twice or more times as many as n tracks when n tracks are allotted to the first frame of the N frames. It is featured in the coding unit forming means that a screen composed of data of each frame in the N frames is divided into a predetermined number of blocks, then a coding block is formed of consecutive k blocks on the screen within the first frame of the N frames for the first frame and of consecutive k blocks within an (i)th frame including and following the second frame of the N frames for the (i)th frame or of a differential block between the (i)th frame and (i−1)th frame, and finally a coding unit is formed of j coding blocks. Meanwhile, the recording means is characterized in that the data of j coding blocks of the coding unit highly efficiently coded by the high efficiency coding means is recorded to j recording blocks at a predetermined position of the first n tracks of the L tracks set solely for the coding units, subsequently, part of the coded data as a high frequency coded data which cannot be recorded to the recording blocks and collected by j coding blocks of the coding unit is recorded to consecutive j recording blocks among the predetermined recording blocks set solely for the coding units in consecutive n tracks of the L tracks, and the highly efficiently coded data of the (i)th frame is recorded to a section other than the first n tracks in the L tracks left when the high frequency coded data is recorded.

Accordingly, since high frequency data of the first frame is recorded from a fixed position every coding unit, the error propagation if the high frequency data of the first frame is erroneously read is positively prevented every coding unit. At the same time, since the addresses and pointers to be recorded are reduced, the efficiency for the bit rate reduction is further improved. Moreover, the apparatus codes data by treating N frames as one unit, and therefore meets the case when the video data of a low rate is to be compressed.

According to a sixth aspect of the present invention, a recording apparatus records input video signals by highly efficiently coding consecutive two frames of the signals as one unit, including a coding unit forming means for dividing data of each frame of the two frames thereby to form coding units, a high efficiency coding means for highly efficiently coding the coding units, and a recording means for dividing and recording the highly efficiently coded data of two frames to 2n tracks. The coding unit forming means is so adapted that each screen composed of data of the first and second frames of the two frames is divided into a predetermined number of blocks, and a coding block is formed of consecutive k blocks within the first frame on the screen for the first frame and of consecutive k blocks within the second frame or of a differential block between the first and second frames for the second frame, and finally a coding unit is constituted of j coding blocks. The recording means of the apparatus records the first frame by recording the coded data of J coding blocks of the coding unit highly efficiently coded by the high efficiency coding means to j recording blocks at a predetermined position in the first n tracks of the 2n tracks set solely for the coding units, then part of the coded data as a high frequency coded data which cannot be recorded to the recording blocks and is a collection of the remaining coded data by j coding blocks to consecutive j recording blocks among the predetermined recording blocks set solely for the coding units in the latter n tracks of the 2n tracks, and also records the second frame by recording the highly efficiently coded data of the second frame to a section of the latter n tracks left after the high frequency coded data is recorded.

According to the invention as above, since high frequency data of the first frame is recorded from a predetermined position every coding unit, the error propagation if the high frequency data of the first frame is erroneously read is positively prevented every coding unit. At the same time, since the addresses and pointers to be recorded are reduced, the efficiency for the bit rate reduction is furthermore improved. Besides, since the recording blocks of the same number as those for the low frequency data of the first frame are secured, and the data of each frame is compressed after being shuffled, the ratio of the coding amount between the first and second frames is variable and kept in the range from 1:1 to 1:0.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

A video signal recording apparatus according to a first and a second embodiments of the present invention will be depicted hereinbelow.

In the first and second embodiments, the video signal recording apparatus is applied to TV signals transmitted in the 525/60 system and, records the video signals every K frames independently after coding with high efficiency. Luminance signals in one frame consist of 720 pixels in the horizontal direction and 480 lines in the vertical direction. At the same time, data composed of 64 pixels, specifically, 8 pixels in the horizontal direction and 8 lines in the vertical direction, constitutes an orthogonal transformation block. Accordingly, luminance signals per one frame include 5400 orthogonal transformation blocks.

Two color difference signals (an R-Y signal and a B-Y signal) constitute one orthogonal transformation block with the pixels included in the same area on the screen as that of the adjacent four orthogonal transformation blocks of luminance signals. In this case, four orthogonal transformation blocks of luminance signals at the same position on the screen, one R-Y signal block and one B-Y signal block, namely, six orthogonal transformation blocks in total is denoted as one macro block. Therefore, one frame is formed of 1350 macro blocks. In the embodiments, one compression block is constituted of one macro block for the first frame of K frames, which is recorded to a corresponding recording block. Accordingly, there are 1350 compression blocks and 1350 recording blocks in K frames.

Figure 1:
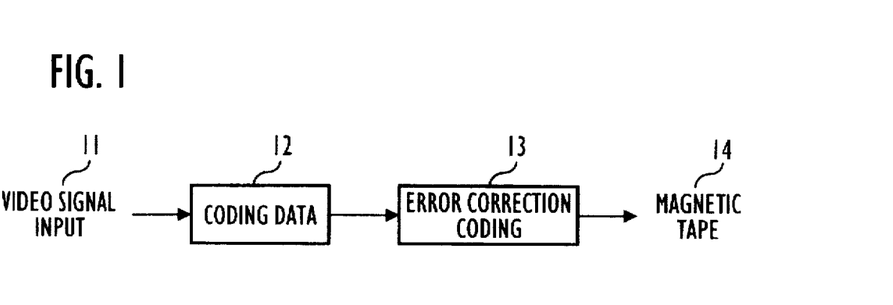
FIG. 1 is a block diagram of a recording apparatus according to a first and a second embodiments of the present invention.

FIG. 1 is a block diagram of the video signal recording apparatus of the first and second embodiments, in which references represent: 11 a video signal input part; 12 a data coding part; 13 an error correcting/coding part; and 14 a magnetic tape, respectively.

Referring to this drawing, a TV signal input through the video signal input part 11 is processed at the data coding part 12 through the bit rate reduction and turned into a recording format. The formatted data is corrected/coded at the error correcting/coding part 13 and recorded to the magnetic tape 14.

Figure 2:
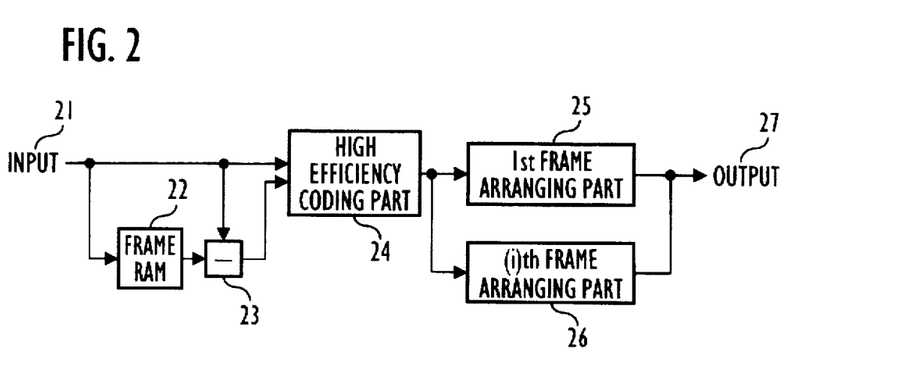
FIG. 2 is a block diagram of a data coding part in the first embodiment.

FIG. 2 is a block diagram of the data coding part of the apparatus, in which references indicate: 21 an input part; 22 a frame RAM; 23 a differentiator; 24 a bit rate reduction part (a high efficiency coding part); 25 a first frame arranging (filling or recording) part; 26 an (i)th frame arranging (filling or recording) part; and 27 an output part.

Figure 3:
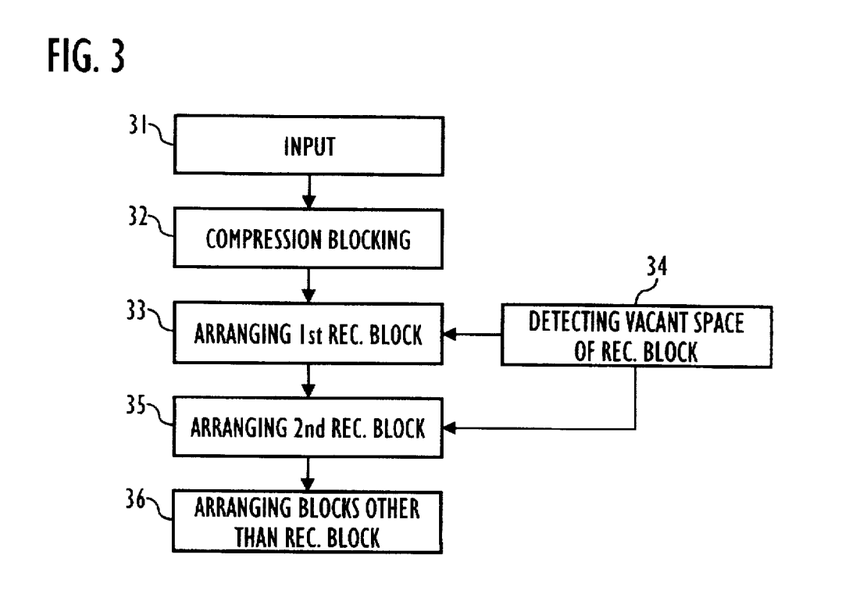
FIG. 3 is a flow chart of a frame arranging part in the first and second embodiments.

Video signals of the first frame input from the input part 21 are sent to the frame RAM 22 and also to the bit rate reduction part 24. The coded data generated from the bit rate reduction part 24 is arranged by the first frame arranging part 25 in accordance with the recording format. The process in the first frame arranging part 25 at this time will be described with reference to FIG. 3. FIG. 3 is a flow chart of the arranging process of the first frame. 31 is an input part of the data processed through the bit rate reduction, similarly, 32 a compression block forming part, 33 a first recording block arranging (filling or recording) part, 34 a recording block vacant space detecting part, 35 a second recording block arranging part (filling or recording), and 36 a remainder arranging part.

The coded data from the input part 31 is divided into compression blocks by the macro block at the compression block forming part 32.

The data of the obtained compression blocks are allotted to the corresponding recording blocks at the first recording block arranging part 33 in the order from more important data in terms of the visual recognition. Data which cannot be arranged to the corresponding recording blocks is temporarily saved in a memory. Therefore, the data saved in the memory is not visually important.

Meanwhile, the recording block vacant space detecting part 34 detects a recording block which still has a vacant space even after all the data in the compression blocks is arranged. Then, the second recording block arranging part 35 arranges the data of the other compression blocks saved in the memory as above to the vacant space detected by the detecting part 34. The whole area in the recording blocks allotted for the first frame is thus utilized.

In the case where the data of the first frame yet remains when the recording blocks are completely arranged, the remainder arranging part 36 arranges the remaining data in a recording area other than the recording blocks. Data of the first frame is accordingly arranged in the manner as above.

How to process the second frame and thereafter will be discussed now. Video signals of the second frame and thereafter (hereinafter referred to as video signals of the (i)th frame ($1<i\leq K$)) which are input from the input part 21 are supplied to the frame RAM 22 and the bit rate reduction part 24. At the same time, video signals of the precedent frame are output from the frame RAM 22. Then, a differential signal between the (i)th frame and the precedent frame is obtained by the differentiator 23. The differential value is input to the bit rate reduction part 24 (high efficiency coding part). The bit rate reduction part 24 alternatively selects and processes the video signal of the (i)th frame or the differential signal of the (i)th frame and the precedent frame.

The video signal of the (i)th frame subsequent to the bit rate reduction is arranged by the (i)th frame arranging part 26 to the remaining recording area after the first frame is arranged. The data of the second frame and thereafter is hence sequentially arranged to the remaining recording area left after the first frame is arranged.

According to the first and second embodiments, the differential value is obtained between the input video signal and a video signal which is delayed one frame at the inputting time. Alternatively, a differential value from a video signal which is delayed one frame and coded highly efficiently and reproduced may be used. Moreover, not only one frame precedent to the subject frame, but a plurality of adjacent frames including one or more precedent frames may be employed.

Figure 4:
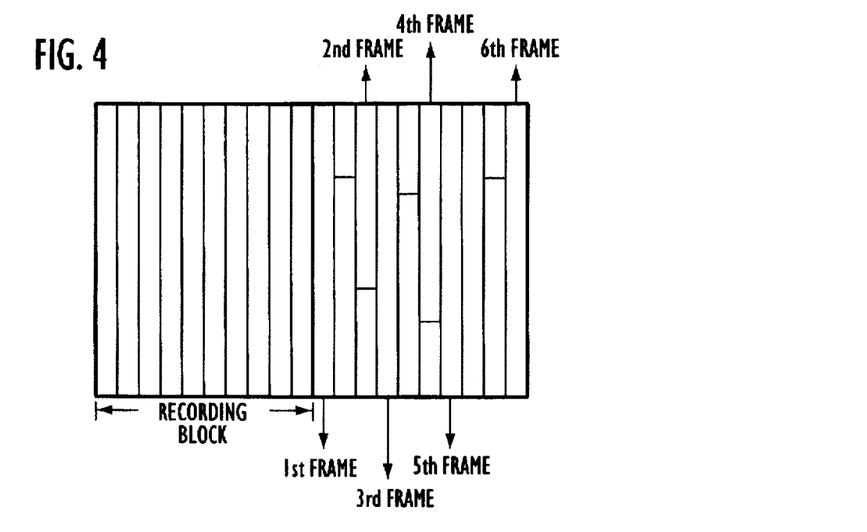
FIG. 4 is an explanatory diagram of a recording format in the first embodiment.

FIG. 4 is an explanatory diagram of a recording format employed in the first embodiment, that is, a recording format whereby data of consecutive six frames are recorded at 20 tracks on the magnetic tape. In FIG. 4, the first 10 tracks of 20 tracks are used as the recording blocks for the first frame, and the latter 10 tracks are used as the recording area to record part of the data of the first frame which cannot be recorded in the above recording blocks and the data of the second-sixth frames. The recording blocks are formed by dividing each track into 135. Since there are formed 1350 recording blocks in the first 10 tracks, the recording blocks become coincident in number with the compression blocks of the macro blocks.

In the above-described structure, the visually important data of the first frame is recorded to the fixed recording blocks, and therefore it becomes possible to limit the influences of the error of the transmission line to minimum. Moreover, since the data of the first frame can be reproduced independently by the recording block, this allows the VCR to reproduce the data at high speeds. Particularly, if the recording blocks are concentrated at a position where the magnetic head scans at the high-speed reproduction time, the quality of the reproduced image at high speeds is improved.

It becomes also possible in the arrangement of FIG. 4 to record the data of one frame obtained from only the highly efficiently coded data within the frame to the recording blocks in 10 tracks. Therefore, all the frames may be coded with high efficiency within the frames and every 10 tracks may be allotted to all the frames in order to slim the circuit scale for the bit rate reduction. In this case, however, the compression rate is lowered to ⅓ the example of FIG. 4. Although the data of six frames is recorded to 20 tracks in FIG. 4, data of four frames may be recorded to 20 tracks or the like constitution may be designed.

As discussed hereinabove, according to the present invention, data of the n compression blocks which is coded highly efficiently only from the data within the frame is recorded to n recording blocks at the fixed position in L tracks. When the data is to be reproduced at high speeds, if the n recording blocks are sequentially scanned, the data composed of the data within the frame can be sequentially reproduced. Therefore, the image is reproduced smoothly even at high speeds. Even if the coding synchronization of the variable-length coding is broken because of the reproduction error, the variable-length coding is reset in the n recording blocks, therefore not adversely influenced by the error. The influences of the error of the transmission line to the data composed of only the important data within the frame can be restricted to minimum.

A video signal recording apparatus according to the second embodiment of the present invention will be described below. One compression block is formed of one macro block in the above first embodiment, whereas it is formed of two macro blocks in the second embodiment. Therefore, one frame includes 675 compression blocks and 675 recording blocks. Moreover, a recording area is completed every two frames in a recording format of the second embodiment.

Figure 5:
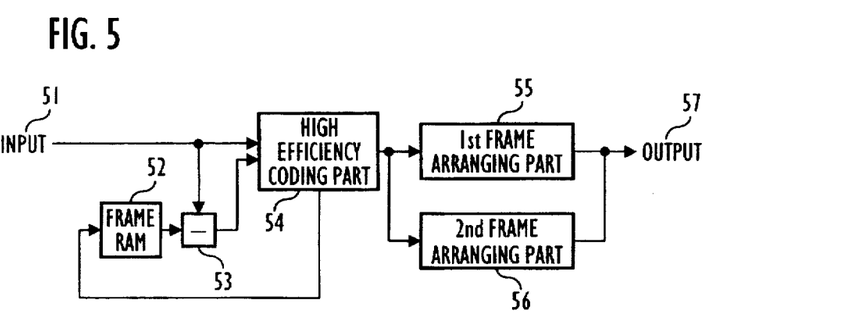
FIG. 5 is a block diagram of a data coding part in the second embodiment.

FIG. 5 is a block diagram of a data coding part of the second embodiment, wherein 51 is an input part; 52 a frame RAM; 53 a differentiator; 54 a bit rate reduction part (a high efficiency coding part); 55 a first frame arranging part; 56 a second frame arranging part, and 57 an output part.

Video signals of the first frame input from the input part 51 are output to the bit rate reduction part 54. The data coded at the bit rate reduction part 54 is arranged to the recording area by the first frame arranging part 55 in the same fashion as in the first embodiment, and then output. The data of the first frame coded at the bit rate reduction part 54 is decoded and input to the frame RAM 52.

In the recording format of the second embodiment, signals of every highly efficiently coded two macro blocks constitute one compression block. The data in each compression block is arranged from the important one to the corresponding recording block. The data which cannot be arranged to the corresponding recording blocks is recorded to the other recording blocks having a vacant space. In the manner as above, the recording area in the recording blocks allotted for the first frame is completely used. If the data of the first frame is still left after the arrangement is finished, the remaining data is arranged to the recording area other than the recording blocks.

Subsequently, video signals of the second frame input from the input part 51 are generated to the bit rate reduction part 54, and at the same time, a differential signal between the video signal of the second frame and a video signal of the precedent frame output from the frame RAM 52 is calculated by the differentiator 53 and sent to the bit rate reduction part 54. The bit rate reduction part 54 selects either one of the video signal of the second frame and the differential signal to process the signal through the bit rate reduction.

The coded video signals of the second frame are arranged by the second frame arranging part 56 to the recording area after the first frame is arranged thereto. Accordingly, the data of the first and second frames are sequentially disposed and output to the recording area.

Figure 6:
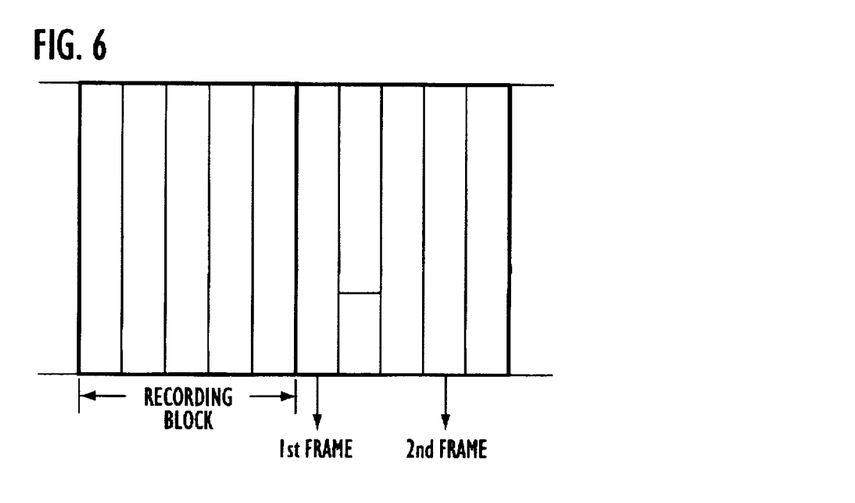
FIG. 6 is an explanatory diagram of a recording format in the second embodiment.

FIG. 6 is a diagram of the recording format in the second embodiment. Data of two consecutive frames are recorded to 10 tracks on the magnetic tape. The first 5 tracks of 10 tracks are used as the recording blocks for the first frame, and the latter 5 tracks are used as the recording area for part of the data of the first frame which cannot be recorded to the recording blocks of the first 5 tracks and the data of the second frame. Each track is divided into 135 blocks.

In the constitution shown in FIG. 6, the visually important data of the first frame is recorded to the fixed recording blocks, so that the influences of the error of the transmission line can be restricted to minimum. Moreover, the data of the first frame can be reproduced by the recording block independently, and therefore the VCR becomes able to reproduce the data at high speeds.

In addition, since the data of one frame which is coded highly efficiently from only the data within the frame can be recorded to the recording blocks of 5 tracks, it becomes possible to allot every 5 tracks to all the frames after executing the bit rate reduction within the frames to reduce the circuit scale of the bit rate reduction. Thus, in the embodiment of FIG. 6, optional 5 tracks may be assigned as the recording blocks, so that the data can be edited every one frame even when the data is coded every two frames.

As depicted hereinabove, two macro blocks are arranged in the recording block and 10 tracks are used for two frames according to the second embodiment of FIG. 6. However, it is possible to assign one macro block to the recording block and use 10 tracks for one frame. In this case alike, all the frames are compressed with the use of the data within the frames, but the compression rate is lowered to ½ the second embodiment. Although the data of two frames is recorded to 10 tracks in FIG. 6, the other arrangement may be conceived.

According to the first and second embodiments, since the data of all the frames can be coded with high efficiency only with the data within the frames approximately in the same recording format, the circuit scale is decreased, while the compression rate may be lowered.

The invention is highly practically useful, because the apparatus eliminates the disadvantages inherent in the prior art as the data of a plurality of frames is processed through the bit rate reduction in the relatively simple arrangement without deteriorating the coding efficiency at all.

The present invention is applicable to video signals other than TV signals of the 525/60 system, and various kinds of bit rate reduction may be performed. The motion compensation may be utilized to obtain the above-referred interframe difference. The invention is realized by software as well.

A third and a fourth embodiments of the present invention will now be described.

The third and fourth embodiments are directed to high definition TV signals which are sampled with 54 MHz sampling frequency and transmitted in the 1250/50 system, and adapted to record the signals every K frames independently through the bit rate reduction.

The luminance signals in one frame are composed of 1440 pixels in the horizontal direction and 1152 lines in the vertical direction, and an orthogonal transformation block is constituted of the data of 64 pixels, i.e., 8 pixels in the horizontal direction and 8 lines in the vertical direction. Therefore, the luminance signals per frame include 25920 orthogonal transformation blocks.

Two color difference signals (an R-Y signal and a B-Y signal) form an orthogonal transformation block with pixels included in the same area on the screen as that of the adjacent four orthogonal transformation blocks of luminance signals. Four orthogonal transformation blocks of the luminance signals at the same position on the screen, one R-Y signal block and one B-Y signal block, six orthogonal transformation blocks in total constitute one macro block. Therefore, one frame includes 6480 macro blocks, 90 in the horizontal direction and 72 in the vertical direction.

The first frame in K frames has one coding block constituted of two macro blocks consecutive one another in the horizontal direction on the screen. The data of the coding block is recorded to a corresponding recording block. Therefore, there are 3240 coding blocks and 3240 recording blocks within K frames.

Further, the first frame in K frames is divided into five areas by dividing the screen equally in the horizontal direction. One coding block is taken out from each area which is at the same position in the horizontal direction, but offset in the vertical direction. The thus-obtained five coding blocks constitute a coding unit composed of 10 macro blocks.

Figure 7:
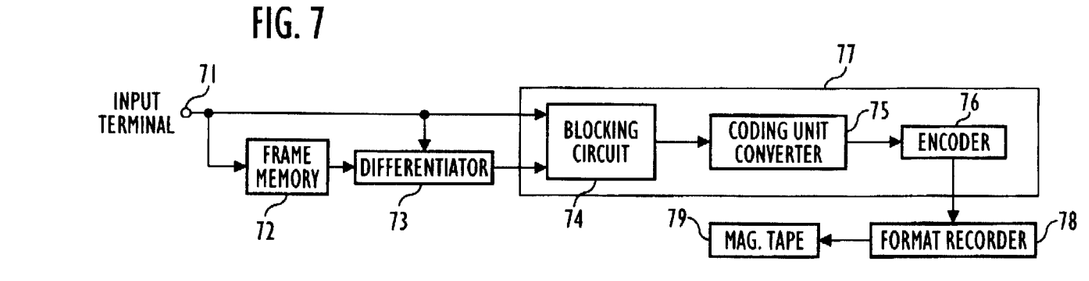
FIG. 7 is a block diagram of a recording apparatus according to a third embodiment of the present invention.

FIG. 7 is a block diagram of the video signal recording apparatus of the third embodiment of the present invention. In FIG. 7, 71 is an input terminal, 72 a frame memory, 73 a differentiator, 74 a block forming device, 75 a coding unit converter, 76 a coder/encoder, 77 a bit rate reduction part (a high efficiency coding part), 78 a format recorder, and 79 a magnetic tape.

The operation of the video signal recording apparatus when the first frame is processed will be described first.

Video signals of the first frame input through the input terminal 71 are sent to the frame memory 72 and the bit rate reduction part 77. The video signals entering the bit rate reduction part 77 are converted to coding blocks by a block forming device 75, and further converted to coding units by a coding unit converter 75. As the data is coded by the coding unit by the coder/encoder 76, the bit rate reduction of the data is executed. The processed data of the coding blocks are recorded to the magnetic tape 79 by the format recorder 78 in accordance with the recording format.

The first frame is recorded in a manner as will be described hereinbelow.

The data of the coding blocks subsequent to the bit rate reduction are sequentially recorded to the corresponding recording blocks from the data with much importance from the visual viewpoint. The data which cannot be recorded in the above process will be denoted as a recording block high frequency data. Subsequently, the recording block high frequency data is recorded bit by bit to a vacant space of the recording block corresponding to each coding block. The recording block high frequency data which cannot be recorded yet through the above process is collected by the coding unit thereby to form a coding unit high frequency data. The recording blocks corresponding to the coding unit data are collected to be a coding unit recording block. Then, the coding unit high frequency data is recorded bit by bit to a vacant space of the coding unit recording block. In the above manner, the recording area within the recording blocks allotted for the first frame is fully utilized. In the case where the coding unit high frequency data which is the data of the first frame still remains when recording of the data to the recording blocks assigned for the first frame is complete, the data is recorded to a recording area other than the recording blocks.

The second frame and thereafter (referred to as an (i)th frame (1<i<K)) will be processed in the following fashion.

A video signal of the (i)th frame input from the input terminal 71 is supplied to the frame memory 72 and the bit rate reduction part 77. Simultaneously with this, the difference of the above video signal from a video signal of the precedent frame output from the frame memory 72 is calculated by the differentiator 73 and input to the bit rate reduction part 77. The bit rate reduction part 77 selects alternatively the video data of the (i)th frame or the difference data of the (i)th frame and the (i−1)th frame and, processes the data through the bit rate reduction in the same manner as for the first frame. The processed data of the (i)th frame is recorded to the magnetic tape 79 by the format recorder 78 in accordance with the recording format. According to the recording format of the (i)th frame of the embodiment, the data of the (i)th frame is sequentially recorded from the second frame to the recording area left after the first frame is recorded as above.

Figure 8:
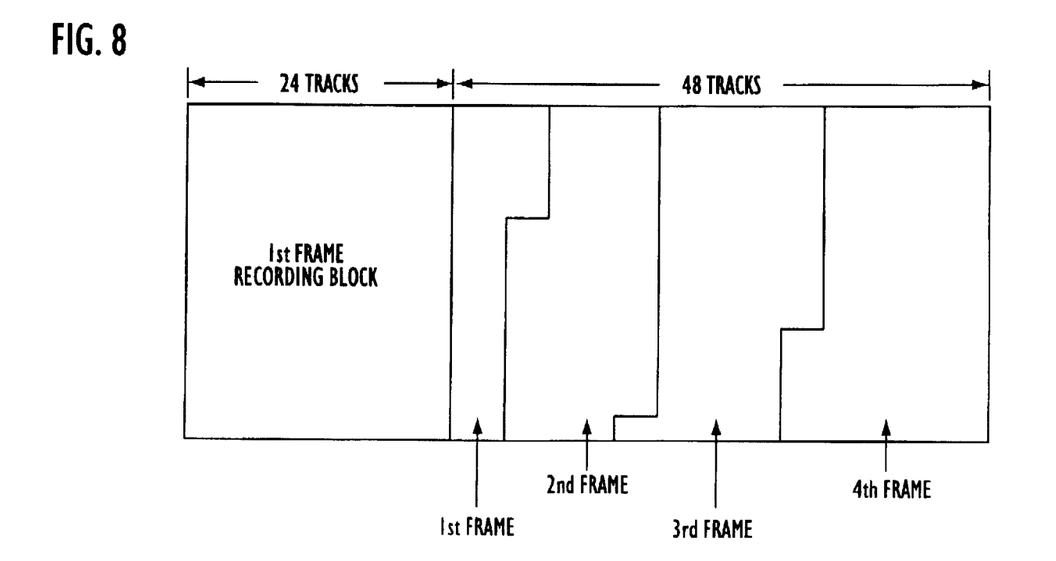
FIG. 8 is an explanatory diagram of a recording format in the third embodiment.

FIG. 8 explains the recording format of the third embodiment.

In the recording format shown in FIG. 8, data of consecutive four frames are recorded to 72 tracks on the magnetic tape. The first 24 tracks are used as the recording block for the first frame, while the latter 48 tracks serve as the recording area to record the remaining data of the first frame and the data of the second-fourth frames. Each track in the recording block is split into 135, and therefore, 3240 recording blocks are set for the first frame.

As described hereinabove, the first frame is processed highly efficiently within the frame and the recording blocks are composed of the visually important data. In the third embodiment of the present invention, since the data of n coding blocks is recorded to fixed n recording blocks within L tracks, it becomes unnecessary to add addresses to the data within the frame, thereby improving the image quality. When the data is to be reproduced at high speeds, since it is possible to sequentially reproduce the data which is composed of only the data within the frame, high-speed reproduction of data is easily achieved. If the data is aligned effectively, the image quality at the time of high-speed reproduction is improved. Moreover, since the variable-length coding is reset in the n recording blocks, the propagation of the error of the transmission line can be restricted.

Although the differential value is obtained between the input video signal and a video signal delayed one frame at the inputting time in the foregoing third embodiment, it is possible to obtain the differential value between the video signal and a video signal reproduced after being highly efficiently coded with one frame delay. Not only a frame precedent to the subject frame, but a plurality of adjacent frames may be used to obtain the difference.

In FIG. 8, data of four frames is recorded to 72 tracks. However, the number of recording frames and also the number of recording tracks may be changed.

Figure 9:
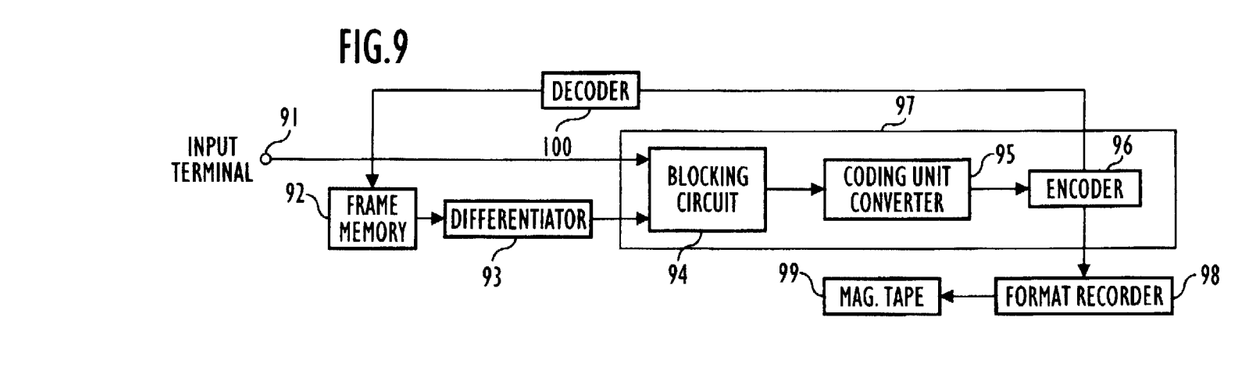
Fig. 9 is a block diagram of a recording apparatus according to a fourth embodiment of the present invention.

FIG. 9 is a block diagram of a video signal recording apparatus according to a fourth embodiment of the present invention, in which 91 is an input terminal; 92 a frame memory; 93 a differentiator; 94 a block forming device; 95 a coding unit converter; 96 a coder/encoder; 97 a bit rate reduction part (a high efficiency coding part); 98 a format recorder; 99 a magnetic tape; and 100 a decoder.

Processing of the first frame in the apparatus will be discussed below.

Video signals of the first frame through the input terminal 91 are input to the bit rate reduction part 97, where the video signal are converted to coding blocks by the block forming device 94 and further converted to coding units by the coding unit converter 95. The coder/encoder 96 encodes the data by the coding unit, so that the data is coded with high efficiency.

The coded data of the coding blocks is recorded to the magnetic tape 99 in compliance with the recording format by the format recorder 98. The data of the first frame processed at the bit rate reduction part 97 is decoded by the decoder 100 and input to the frame memory 92.

The first frame is recorded in the recording format of the embodiment as follows.

The coded data of coding blocks is first recorded to the corresponding recording blocks sequentially from one with higher visual importance. The data which cannot be recorded in the above process is represented as a recording block high frequency data. Then, the recording block high frequency data is recorded bit by bit to a vacant space of the recording block corresponding to each coding block. The recording block high frequency data which cannot be recorded even in the above process is collected every coding unit to form a coding unit high frequency data. On the other hand, the recording blocks corresponding to the coding unit are gathered to form a coding unit recording block. The coding unit high frequency data is recorded bit after bit to a vacant space of the coding unit recording block. The recording area within the recording blocks allotted for the first frame is totally made use of in the above-depicted manner. If the coding unit high frequency data which is the data of the first frame remains after the recording blocks for the first frame are completely used, the remaining data is recorded to the other recording area than the recording blocks.

Processing of the second frame and thereafter (referred to as an (i)th frame (1<i≦K)) will be discussed hereinbelow.

Video signals of the second frame from the input terminal 91 are input to the frame memory 92 and the bit rate reduction part 97. At the same time, the difference between the input video signal and a video signal of the precedent frame supplied from the frame memory 92 is calculated by the differentiator 93 and fed to the bit rate reduction part 93. The bit rate reduction part 97 selects either the video data of the second frame or the difference data of the first and second frames, and codes the data highly efficiently in the same manner as in the case of the first frame.

The above-processed data of the second frame is recorded to the magnetic tape 99 by the format recorder 98 based on the recording format. According to the, recording format of the second frame of the embodiment, the second frame is sequentially recorded to the recording area left after the first frame is recorded.

Figure 10:
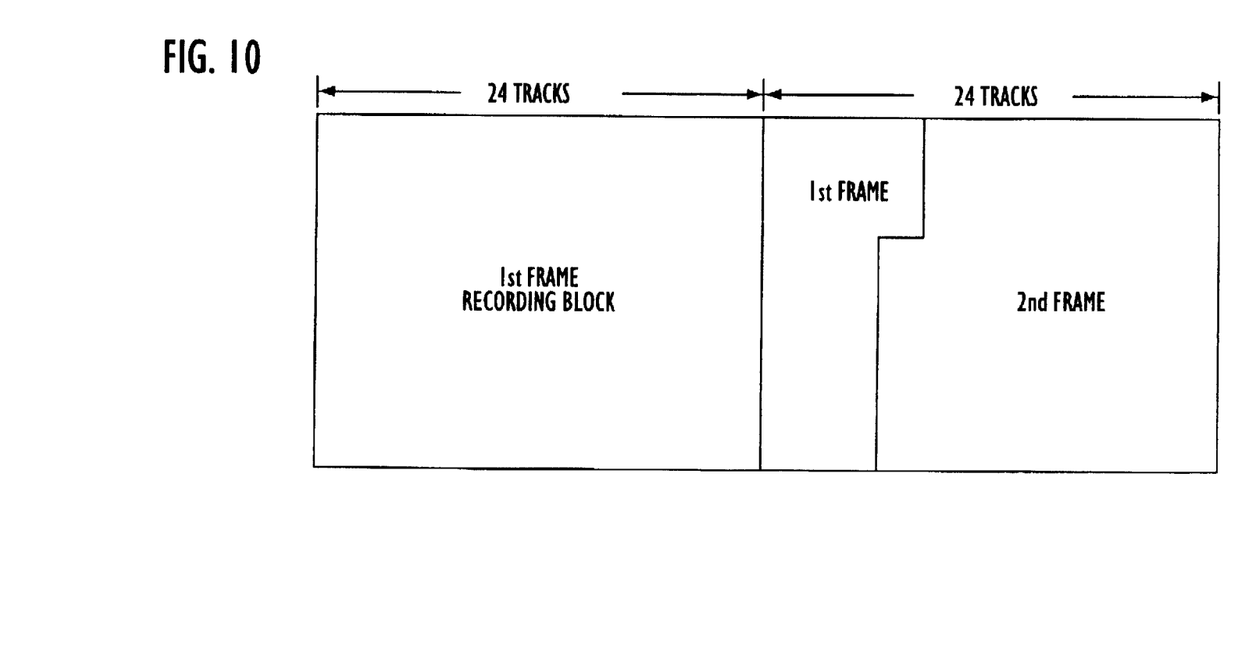
FIG. 10 is an explanatory diagram of a recording format in the fourth embodiment.

The recording format of the fourth embodiment is shown in FIG. 10.

In the recording format of FIG. 10, data of consecutive two frames is recorded to 48 tracks on the magnetic tape. The preceding 24 tracks are utilized as the recording block for the first frame, and the succeeding 24 tracks are used as the recording area to record the data of the first frame left without being recorded to the recording block and the data of the second frame. At this time, each track of the recording block is split into 135, and therefore, 3240 recording blocks are provided.

In the constitution as above, the data of the first frame is coded with high efficiency within the frame, and the recording blocks are composed of the visually important data. Since the data of n coding blocks are recorded to fixed n recording blocks within L tracks, it is not necessary to assign addresses to the data in the frame, and the image quality is improved. Moreover, at the reproducing time at high speeds, data composed of the data within the frame is sequentially reproduced and accordingly at high speeds easily. If the data is arranged effectively, it becomes possible to further improve the image quality at the high-speed reproduction time. Since the variable-length coding is reset in the n recording blocks even in the presence of the error of the transmission line, the error is refrained from spreading.

Data within two frames is recorded to the first n recording tracks after the data is coded highly efficiently every two frames, so that most of the data in the first frame can be reproduced only by the first n tracks, and consequently allowing the edition of data by the frame although the data is compressed every two frames.

Besides, in the third and fourth embodiments, two consecutive macro blocks in the horizontal direction on the screen are turned into coding blocks to form a coding unit. Therefore, the circuit for forming a coding unit used in the current TVs is shared also in the present invention.

While the input signals in the third and fourth embodiments are high definition TV signals in the 1250/60 system sampled with 54 MHz sampling frequency, needless to say, the invention is applicable to high definition TV signals in different systems and sampled with the other sampling frequencies. The motion compensation may be used when the difference to the input image is to be obtained. If the coding unit high frequency data is recorded to a track successive to the track where the data of the first frame is recorded, the circuit structure is more simplified.

Hereinbelow will be described a fifth and a sixth embodiments of the present invention. 20 tracks are allotted for every one input frame and, each track is divided into 135 recording blocks. Given that an orthogonal transformation block composed of the data of 64 pixels, 8 pixels in the horizontal direction and 8 lines in the vertical direction is a macro block consisting of 6 orthogonal transformation blocks, namely, 4 adjacent orthogonal transformation blocks of the luminance signals, and two blocks of the color difference signals included in the same area on the screen as that of the four luminance signals, one coding block is formed of two consecutive macro blocks in the horizontal direction on the screen, and a coding unit is a combination of the thus-formed five coding blocks. Accordingly, there are 540 coding units.

Figures 11, 12:
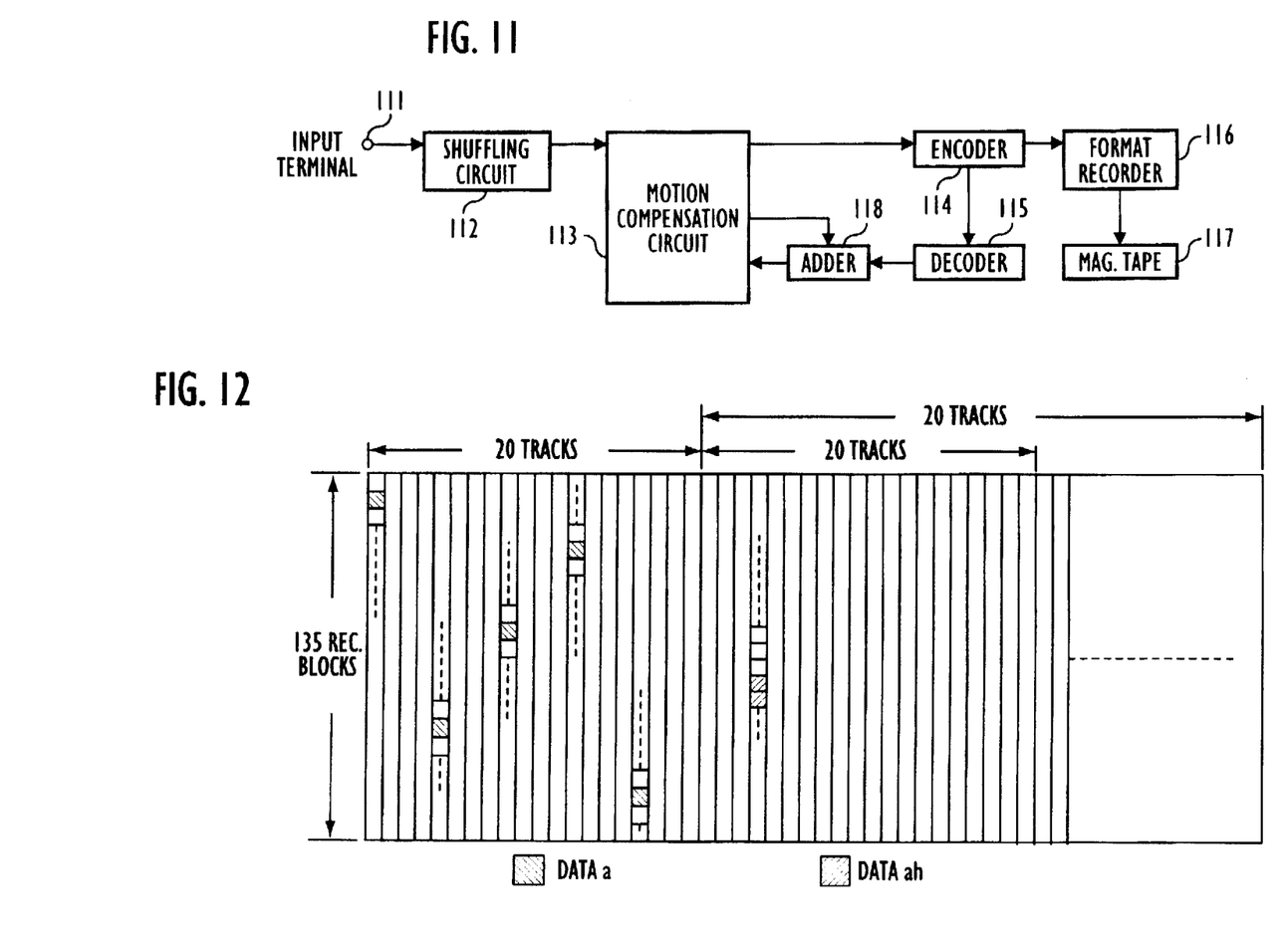
FIG. 11 is a block diagram of a recording apparatus according to a fifth embodiment of the present invention.
FIG. 12 is an explanatory diagram of a recording format in the fifth embodiment of the present invention.

FIG. 11 indicates a block diagram of the video signal recording apparatus of the fifth embodiment. In FIG. 11, 111 represents an input terminal; 112 a shuffling circuit; 113 a motion compensation circuit; 114 a coding circuit; 115 a decoding circuit; 116 a format recording circuit; 117 a magnetic tape; and 118 an adder circuit.

The recording apparatus of the above-described structure operates in the following manner. First, processing of the first frame will be depicted.

Data of the first frame input from the input terminal 111 (referred to as data a) is fed to the shuffling circuit 112. The data a input to the shuffling circuit 112 forms coding units as described above, which are generated to the motion compensation circuit 113. The data a is not compensated in the motion compensation circuit 113 and therefore output as it is to the coding circuit 114. The data a coded efficiently in the coding circuit 114 is output to the format recording circuit 116 and the decoding circuit 115.

In the format recording circuit 116, the data is recorded from the low frequency data with higher visual importance according to the set recording format to the recording blocks predetermined by the coding unit in the first 20 tracks of the magnetic tape 117, for instance, the recording blocks of the first 20 tracks in FIG. 12.

Supposing that part of the data a which cannot be recorded in the above process is designated by data ah, the data ah is sequentially recorded to five consecutive recording blocks among the recording blocks predetermined by the coding unit in optional consecutive 20 tracks within the latter L tracks, e.g., five consecutive recording blocks shown in the latter L tracks in FIG. 12. The data a input to the decoding circuit 115 is decoded and input to the adder circuit 118, and output to the motion compensation circuit 113 without being processed at the adder circuit 118. The detecting process of a motion vector at the motion compensation circuit 113 is not started until the second frame is input.

Processing of the (i)th frame subsequent to the second frame will be described.

The data of the (i)th frame input from the input terminal 111 (referred to as data i) is input to the shuffling circuit 112. In the same manner as for the first frame, the data is turned to coding units in the shuffling circuit 112 and output to the motion compensation circuit 113. A motion vector of the input data i to the data (i−1) of the one precedent frame is detected in the motion compensation circuit 113. If the motion compensation is necessary, the differential value between the data (i−1) and the data i is obtained with the use of the motion vector and generated to the coding circuit 114. If the motion compensation is not carried out, the data i is directly output to the coding circuit 114. The coding circuit 114 conducts the same process as in the case of the first frame, and the processed data is output to the format recording circuit 116 and the decoding circuit 115. At this time, the final frame is not generated to the decoding circuit 115. The data is sequentially recorded by the format recording circuit 116 in accordance with the predetermined recording format after the data (i−1) is recorded to the latter L tracks where the data ah of the first frame is not recorded. The decoding circuit 115 decodes the data i and sends to the adder circuit 118 which in turn obtains the sum of the data i and part of the data (i−1) generated from the motion compensation circuit 113 and from which the difference to the data i is obtained in the motion compensation circuit 113, and outputs the sum to the motion compensation circuit 113.

Accordingly, in the above embodiment, because of the coding unit forming means for forming the input data from the input terminal 111 into coding units in the shuffling circuit 112 as above, the bit rate reduction means for coding the data with high efficiency in the coding circuit 114, and the recording means which records the data a from the visually important lower frequency data to the recording blocks of the preceding tracks predetermined by the coding unit in accordance with the set recording format and, records the data ah which cannot be recorded in the above process sequentially to a preset number of consecutive recording blocks at the predetermined position among the latter recording blocks of the same number as those of the data a, and further records the data i in accordance with the predetermined recording format sequentially to the latter tracks where the data ah of the first frame is not recorded, the high frequency data of the first frame is recorded from the predetermined position every coding unit. Therefore, even if the high frequency data of the first frame is erroneously read, the error propagation is positively prevented every coding unit. Since the addresses and pointers to be recorded are reduced, the coding efficiency is improved. Further, since N frames are coded highly efficiently as one unit, the apparatus can deal with the compression of video data of a low rate.

Although the data ah is recorded to a track consecutive to the track where the data a is recorded in the above embodiment, any optional consecutive 20 tracks within the L tracks may be used. If the number of tracks allotted for the (i)th frame is reduced from 20, more efficient coding is achieved. The recording position of the (i)th frame is not limited to the above, but may be optionally set.

Figures 13, 14:
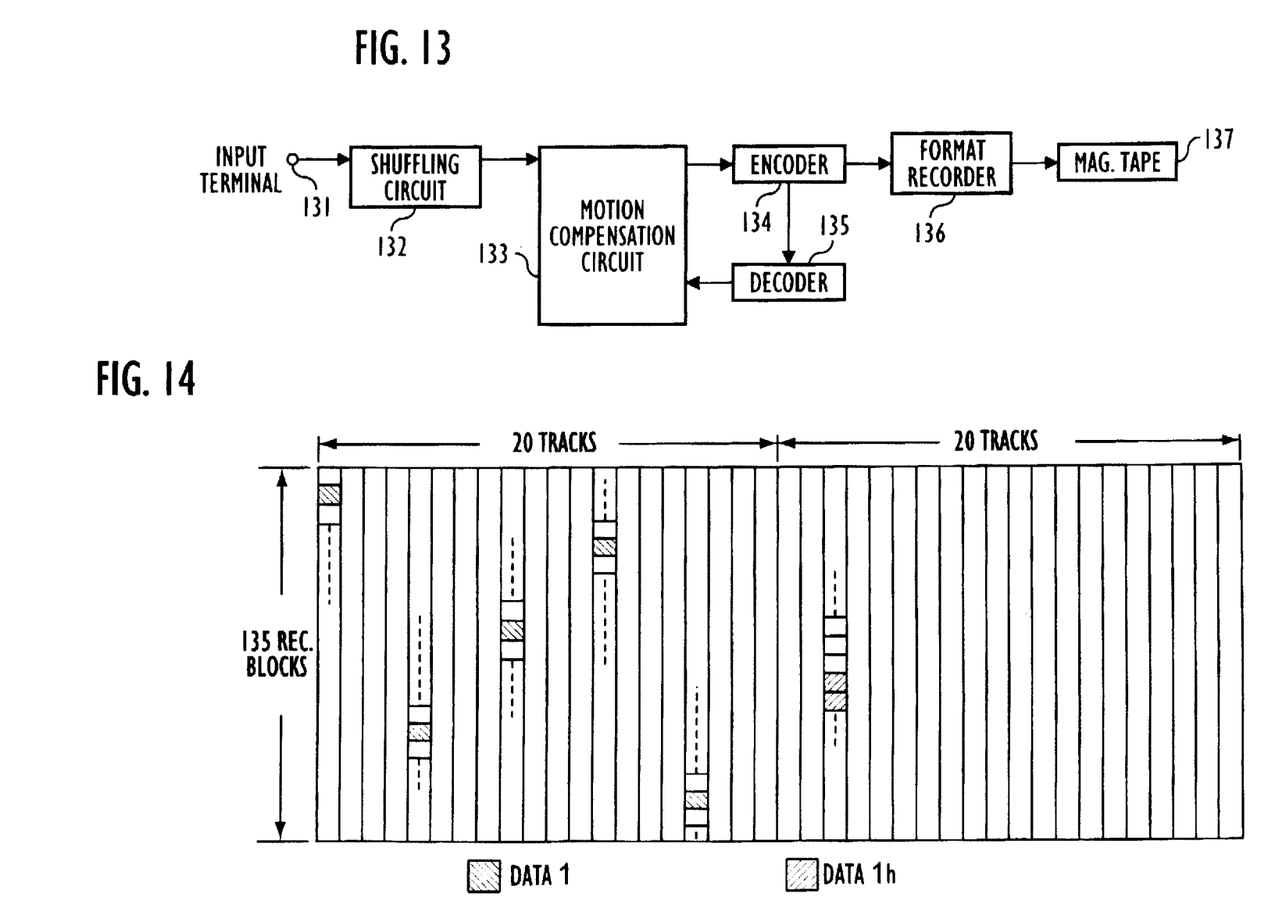
FIG. 13 is a block diagram of a recording apparatus according to a sixth embodiment of the present invention.
FIG. 14 is an explanatory diagram of a recording format in the sixth embodiment.

FIG. 13 is a block diagram of a video signal recording apparatus according to the sixth embodiment, in which 131 is an input terminal; 132 a shuffling circuit; 133 a motion compensation circuit; 134 a coding circuit; 135 a decoding circuit; 136 a format recording circuit; and 137 a magnetic tape.

The operation of the video signal recording apparatus of the sixth embodiment, more specifically, when the first frame is processed will be first described below.

The data of the first frame input from the input terminal 131 (referred to as data 1) is generated to the shuffling circuit 132. The data 1 input to the shuffling circuit 132 is turned into coding units as described earlier and sent to the motion compensation circuit 133. The data 1 is not processed in the motion compensation circuit 133, and output to the coding circuit 134 as it is. The data 1 subjected to the bit rate reduction in the coding circuit 134 is output to the format recording circuit 136 and the decoding circuit 135.

In the format recording circuit 136, the data is recorded from the visually important, lower frequency data according to the set recording format to the predetermined recording blocks by the coding unit in the first 20 tracks of the magnetic tape 137 among 40 tracks prepared for two frames, e.g., first 20 recording tracks in FIG. 14. Subsequently, data 1h of the data 1 which is left without being recorded in the above process is recorded sequentially to the consecutive 5 recording blocks of the recording blocks predetermined by the coding unit in the latter 20 tracks of the magnetic tape 137, for instance, consecutive 5 recording blocks shown in the latter 20 tracks of FIG. 14. At the same time, the data 1 input to the decoding circuit 135 is decoded and output to the motion compensation circuit 133 which stands by until the second frame is input thereto to detect a motion vector.

Now, processing of the second frame in the recording apparatus will be described.

The data of the second frame input from the input terminal 131 (denoted by data 2 hereinafter) is input to the shuffling circuit 132. The shuffling circuit 132 forms the data into coding units, similar to the case of the first frame, and outputs the data to the motion compensation circuit 133. A motion vector of the data 2 input to the motion compensation circuit 133 to the already input data 1 is detected. When the motion compensation is to be effected, the obtained motion vector is used to calculate the differential value of the data 1 and 2. If the motion compensation is not required, the data 2 is generated to the coding circuit 134. The coding circuit 134 codes the data with high efficiency in the same manner as for the first frame, and feeds the data only to the format recording circuit 136. As a result, the data is recorded to the latter 20 tracks where the data 1h of the first frame is not recorded, in accordance with the recording format predetermined by the format recording circuit 136.

As is fully described above, the video signal recording apparatus of the embodiment is provided with the coding unit forming means for forming the data input through the input terminal 131 into coding units by the shuffling circuit 132, the bit rate reduction means for coding the data with high efficiency in the coding circuit 134, and the recording means which records the data 1 from the visually important, low frequency data to the recording blocks of the first tracks predetermined every coding unit in accordance with the set recording format, records the data 1h of the data 1 remaining without being recorded sequentially to the predetermined number of consecutive recording blocks among the predetermined recording blocks of the latter tracks, and also records the data 2 sequentially to the latter tracks where the data 1h of the first frame is not recorded in accordance with the predetermined recording format. Since the high frequency data of the first frame is recorded from the predetermined position every coding unit, even if the high frequency data of the first frame is erroneously read, the error is positively prevented every coding unit from spreading, and the addresses and pointers to be recorded are decreased, whereby the coding efficiency for the bit rate reduction is furthermore improved as compared with the prior art. Since the recording blocks of the same number as those of the low frequency data of the first frame are secured, if the ratio of the coding amount between the first and second frames for the bit rate reduction is set to 1:1, the data 1h is not produced. Moreover, if the ratio is 1:0 as in the case of still images, the data 1h uses all the 5 recording blocks. Therefore, in the invention, the ratio of the coding amount of two frames for the bit rate reduction can be set within the range from 1:1 to 1:0 since the data of each frame is compressed after being shuffled.

In the fifth and sixth embodiments, the data is shuffled before being recorded. However, the constitution of coding units may be changed before recording after the data is coded. Further, input signals, the number of tracks, the number of coding units constituting one frame, and the constitution of the coding block may be set optionally. The data of the first frame which cannot be recorded to the first tracks and the data from which the differential value is obtained are made arrangeable to consecutive recording blocks, but it is needless to say that the recording area may be fixed.

It is to be noted that the format recorder in one of third to sixth embodiments may record code data after error correction coding before outputting them as in the first or second embodiment.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A video signal recording apparatus for recording video signals on a video tape comprising:

a group means for grouping input moving video signals every K frames (K is an integer larger than 1);

a high efficiency coding means for highly efficiently coding a first frame in a group with data within said first frame and 2nd to Kth frames in said group in a manner such that a total data length including a data length of said first frame is fixed at a predetermined data length corresponding to S×L recording tracks (S is an integer equal to or larger than 2 and L is an integer larger than 1);

a block forming means for dividing coded data of said first frame into a predetermined number n of compression blocks, each having a variable data length;

a first arranging means for allocating n recording blocks each having a fixed data length at predetermined positions on said S×L recording tracks and arranging data of each compression block of said first frame to a corresponding one of said n recording blocks from the head of said corresponding one sequentially;

a second arranging means for arranging data when detected to be overflowed from each of said n recording blocks to one or more vacant areas of said n recording blocks if exist;

a third arranging means for, in the case where the data of the n compression blocks of said first frame remain even after all of said n recording blocks corresponding to said first frame are fully occupied, recording said remaining data of said first frame on a section of said S×L recording tracks not occupied by said n recording blocks; and a fourth arranging means for arranging the highly efficiently coded data of the second to Kth frames to remaining sections of said S×L recording tracks left when said remaining data of said compression blocks of said first frame have been recorded.

2. The video signal recording apparatus according to claim 1, wherein said n recording blocks needed for recording the coded data of said first frame are allocated to successive L recording tracks of said S×L recording track.

* * * * *